(12) United States Patent
Perantatos et al.

(10) Patent No.: US 7,444,597 B2
(45) Date of Patent: Oct. 28, 2008

(54) ORGANIZING ELEMENTS ON A WEB PAGE VIA DRAG AND DROP OPERATIONS

(75) Inventors: George Perantatos, Seattle, WA (US); Christopher Edward White, Seattle, WA (US); Boxin Li, Bellevue, WA (US); Nathan James Fink, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 418 days.

(21) Appl. No.: 11/083,550

(22) Filed: Mar. 18, 2005

(65) Prior Publication Data

US 2006/0212790 A1   Sep. 21, 2006

(51) Int. Cl.
*G06F 17/00* (2006.01)
*G06F 3/048* (2006.01)

(52) U.S. Cl. .................. 715/769; 715/205; 715/770

(58) Field of Classification Search .................. None
See application file for complete search history.

(56) References Cited

U.S. PATENT DOCUMENTS

| | | | | |
|---|---|---|---|---|
| 5,845,299 | A | 12/1998 | Arora et al. | 715/513 |
| 5,848,424 | A | 12/1998 | Scheinkman et al. | 715/501.1 |
| 5,911,145 | A | 6/1999 | Arora et al. | 715/514 |
| 5,917,491 | A | 6/1999 | Bauersfeld | 715/810 |
| 5,974,455 | A | 10/1999 | Monier | 709/223 |
| 6,161,112 | A | 12/2000 | Cragun et al. | 715/501.1 |
| 6,498,920 | B1 | 12/2002 | Simon | 434/350 |
| 6,546,388 | B1 | 4/2003 | Edlund et al. | 707/5 |
| 6,587,119 | B1 * | 7/2003 | Anderson et al. | 345/672 |
| 7,028,254 | B2 | 4/2006 | Xia et al. | 715/513 |
| 7,165,098 | B1 | 1/2007 | Boyer et al. | 709/219 |
| 7,194,683 | B2 | 3/2007 | Hind et al. | 715/522 |
| 2002/0065800 | A1 | 5/2002 | Morlitz | 707/1 |
| 2003/0120654 | A1 | 6/2003 | Edlund et al. | 707/7 |
| 2004/0210532 | A1 | 10/2004 | Nagawa et al. | 705/51 |
| 2005/0091324 | A1 | 4/2005 | Flocken | 709/206 |
| 2006/0212713 | A1 | 9/2006 | Hatakeda | 713/182 |
| 2006/0212792 | A1 | 9/2006 | White et al. | 715/511 |
| 2006/0212806 | A1 | 9/2006 | Griffin et al. | |
| 2007/0050710 | A1 | 3/2007 | Redekop | 715/523 |

OTHER PUBLICATIONS

"Microsoft Word 2000," Copyright Date: 2000.*
Underdahl, Brian. "Windows 98 One Step at a Time." Copyright Date: 1998.*
Buyens, Jim. "Microsoft Front Page 2003—Inside Out". Copyright: Aug. 7, 2003.*
Mantaro, Jessica. "Microsoft Front Page 2003—The Missing Manual". Copyright: Aug. 1, 2005.*

(Continued)

*Primary Examiner*—Doug Hutton
*Assistant Examiner*—Soumya Dasgupta
(74) *Attorney, Agent, or Firm*—Merchant & Gould

(57) ABSTRACT

Methods, systems and computer-readable media are provided for organizing links on a web page via drag and drop operations. Single web page links or groups of web page links may be dragged from one location on a web page to another location on a web page or to another group of links on the web page. Links may also be dragged from a first web page or first client application document and may be dropped to a second web page on a same or separate web browsing application.

18 Claims, 6 Drawing Sheets

OTHER PUBLICATIONS

Oneline Training Solutions. "Microsoft Front Page 2003—Step by Step". Copyright: Jul. 30, 2003.*

U.S. Appl. No. 11/083,563, filed Mar. 18, 2005, entitled "Application of Presentation of Styles to Items on a Web Page", Inventors: Griffin et al.

U.S. Official Action mailed Feb. 22, 2008 in U.S. Appl. No. 11/083,563.

Word 2003, 1 Page, Determining formatting options. Microsoft Word Help.

U.S. Office Action dated Oct. 9, 2007 cited in U.S. Appl. No. 11/083,480.

Underdahl, Brian, "Dragging data between programs", Jan. 1, 1998, *Windows 98 One Step at a Time*, IDG Books Worldwide, Inc., An International Data Group Company, 919 E. Hillsdale Blvd., Suite 400, Foster City, CA 94404, (3 pages).

"The Professional Choice for building websites and Internet applications", Macromedia—Dreamweaver MX: Product Overview, Jun. 5, 2003, http://web.archive.org/web/20030605163940/www.macrodedia.com/software/dreamweaver, (3 pages).

"Editing ASP Files with Microsoft FrontPage 2000", Nov. 12, 1999, http://msdn21.microsoft.com/en-us/library/aa140029(office.10,d=printer).aspx, (7 pages).

"Publishing with Microsoft FrontPage 2000", Mar. 30, 1999, http://msdn2.microsoft.com/en-us/library/aa140032(office.10,d=printer).aspx, (7 pages).

"Using Themes and Shared Borders in Microsoft FrontPage 2000", Jul. 29, 1999, http://msdn2.microsoft.com/en-library/aa140031(office.10,d=printer).aspx, (1 pages).

"Working with Data Access Pages in FrontPage 2000", Jan. 1999, http://msdn2.microsoft.com/en-us/library/aa140027(office.10,d=printer).aspx, (8 pages).

"Microsoft Word 2000", Copyright Date: 2000, (11 pages).

U.S. Office Action dated Jun. 8, 2007 cited in U.S. Appl. No. 11/083,563.

U.S. Final Office Action dated Jul. 3, 2008 cited in U.S. Appl. No. 11/083,480.

* cited by examiner

ORGANIZING ELEMENTS ON A WEB PAGE VIA DRAG AND DROP OPERATIONS

FIELD OF THE INVENTION

The present invention generally relates to organization of content on Internet and intranet-based web pages. More particularly, the present invention relates to organizing elements on a web page via drag and drop operations.

BACKGROUND OF THE INVENTION

With the advent of the computer age, computer and software users have grown accustomed to user-friendly software applications that help them write, calculate, organize, prepare presentations, send and receive electronic mail, make music, and the like. For example, modern electronic word processing applications allow users to prepare a variety of useful documents. Modern spreadsheet applications allow users to enter, manipulate, and organize data. Modern electronic slide presentation applications allow users to create a variety of slide presentations containing text, pictures, data or other useful objects. Internet and intranet browsing applications allow users to navigate to a variety of useful pages for viewing or interacting with information on numerous topics.

Typical Internet and intranet accessible web pages often include information such as text, images, music, and the like associated with one or more topics. In addition, many web pages include links to various resources contained either on the same web page as a given link or contained on a different web page that may be browsed to in response to selecting a given link. Selection of a given link causes the user's web browsing application to locate and display or otherwise execute the resource associated with the selected link.

According to prior methods and systems, web page authors and editors must organize resources on a web page, including web page links, through a manual process. For example, if a web page author desires to organize links on a news web page by re-ordering certain links or by moving a given link from a first location on a given web page to a second location on the web page, the web page author must launch a web page editing application or tool and manually make the desired changes. Unfortunately, such a process is time consuming, cumbersome, and does not provide efficient feedback to the author because the author must re-open the revised web page to fully appreciate the changes. If the changes are not satisfactory, the author must repeat the process until she receives a satisfactory result.

Accordingly, there is a need for methods and systems for managing elements on a web page that allows for quick and efficient reorganization of elements and that provides feedback to the web page author/editor as changes are made. It is with respect to these and other considerations that the present invention has been made.

SUMMARY OF THE INVENTION

Embodiments of the present invention solve the above and other problems by providing methods and systems for organizing elements on a web page via drag and drop operations. According to one embodiment of the present invention, a user may enter an edit mode for editing the content of a given web page. Upon selecting a web page element, the selected element may be moved to another location on the selected web page via a drag and drop operation. Movement of the selected element causes movement of the element text, any associated images or metadata, and any underlying code or data that associates the element with a given web page resource or that allows the element to be used for browsing to the given web page resource.

According to one embodiment, upon selecting a given link or group of links while the user's browsing application is in edit mode, the cursor is transformed into a four-way arrow to alert the user that the selected link will be moved when the cursor is moved. According to this embodiment, as the cursor is moved, a "ghost" image of the selected link(s) follows the cursor across the web page to provide a visual indication of movement of the selected link. As the selected link(s) is dragged to a target location, a colored horizontal line or bar extending the width of a group of links or web page area to which the link(s) is being moved snaps into the position where the cursor stops to provide a visual indication or feedback as to where the dragged link(s) will be displayed and how a group of links to which the dragged link is added will be reordered by the drag and drop operation.

According to another embodiment, if a dragged link is moved to a group of links that has an applied group-level ordering, for example, alphabetical ordering, the group-level ordering controls the ordering, and the dragged link is positioned within the group of links according to the applied ordering regardless of the location within the group at which the link is dropped. When a group-level ordering is applied, and a dragged link is moved to the group, a visual indication, for example, a colored line around the entire group, may be displayed to visually indicate that the link is being dropped into a group having a group-level ordering.

According to another embodiment, a link or group of links may be dragged from a first browsing application window to a second browsing application window for dropping into a web page part or control displayed in the target window. In addition, content or links from a separate client application, for example, a contacts application or word processing application, may be dragged to and dropped into a web part or control in an Internet or intranet browsing application window.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

As briefly described above, embodiments of the present invention are directed to methods and systems for organizing elements on a web page via drag and drop operations. Embodiments of the present invention are described with reference to organizing web page links, but embodiments of the present invention are equally applicable to other web page content, such as images or paragraphs of text. According to embodiments of the present invention, single web page links or groups of web page links may be dragged from one location on a web page to another location on a web page or to another group of links on the web page. Links may also be dragged from a first web page or first client application document and may be dropped to a second web page on a same or separate web browsing application. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
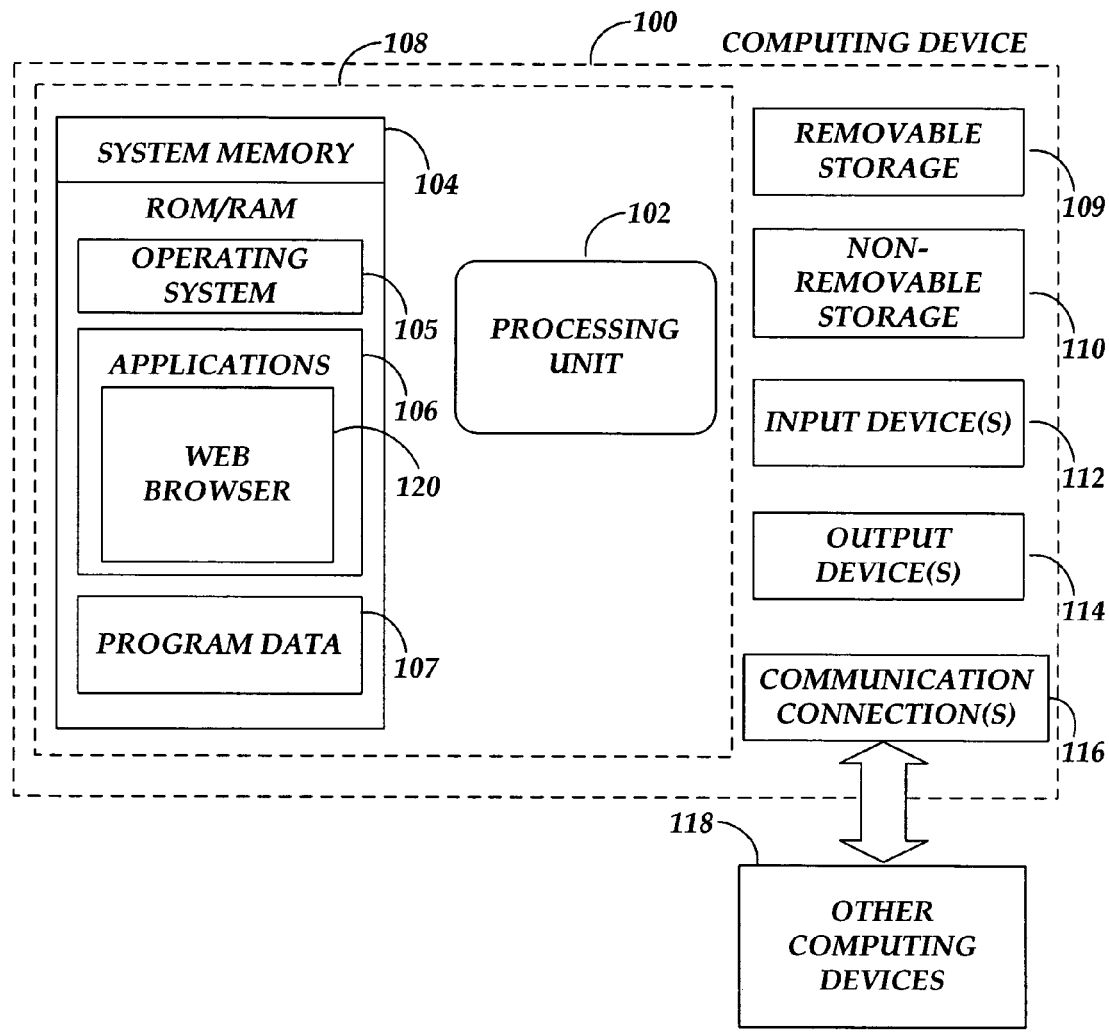
FIG. 1 is a block diagram showing the architecture of a personal computer that provides an illustrative operating environment for embodiments of the present invention.

Referring now to the drawings, in which like numerals refer to like elements through the several figures, aspects of the present invention and an exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Embodiments of the invention may be implemented as a computer process (method), a computing system, or as an article of manufacture, such as a computer program product or computer readable storage media. The computer program product may be a computer storage media readable by a computer system and encoding a computer program of instructions for executing a computer process.

With reference to FIG. 1, one exemplary system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a web browsing application 120, such as INTERNET EXPLORER®, manufactured by MICROSOFT CORPORATION. This basic configuration is illustrated in FIG. 1 by those components within dashed line 108.

The computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network in a distributed computing environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

A number of program modules and data files may be stored in the system memory 104 of the computing device 100, including an operating system 105 suitable for controlling the operation of a networked personal computer, such as the WINDOWS operating systems from MICROSOFT Corporation of Redmond, Wash. System memory 104 may also store one or more program modules, such as word processor application 120, and others described below. The web browsing application 120 is operative to provide functionality for viewing, editing, and processing electronic information via one or more Internet-based or other network-based web pages. In addition, as described herein, web page content is edited in a web page editing mode. Web page editing may be performed via an editing mode of the web browsing application 120, or via another suitable web page editing application or tool may be programmed for allowing editing of a web page via a drag and drop operation described herein. Other applications 106 that may be used in accordance with embodiments of the present invention include electronic mail and contacts applications, word processing applications, spreadsheet applications, database applications, slide presentation applications, drawing or computer-aided application programs, etc.

Figure 2:
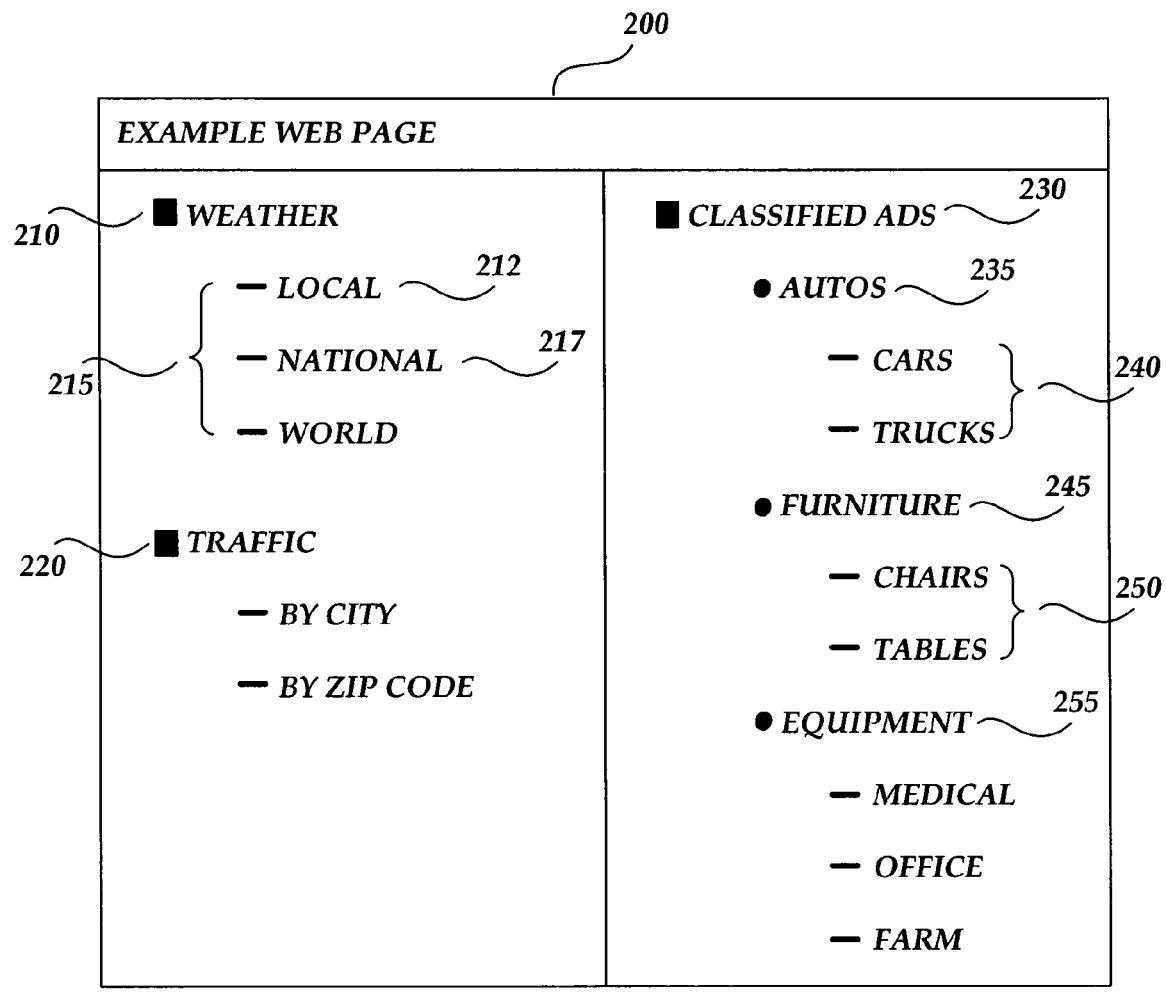
FIG. 2 illustrates a computer screen display showing an example Internet-based web page containing a plurality of web page links.

FIG. 2 illustrates a computer screen display showing an example Internet-based web page containing a plurality of web page links. The example web page 200 is illustrative of any Internet-based or intranet-based web page with which a web page author may provide a variety of information and links to web page resources or to the resources of other web pages. For example, the example web page 200 includes a number of listings of web page links to allow a user to browse to associated resources. For example, a weather listing 210 includes links 215 for allowing a user to obtain useful weather information. For example, a local weather link 212 may allow a user to click on the link for downloading or otherwise browsing to a resource for obtaining local weather information. Likewise, a national weather link 217 may allow the user to download or browse to a resource for obtaining national weather information. A second listing 220 includes two links for obtaining traffic information. On the right-hand side of the example web page 200, a listing 230 includes three groups of listings associated with classified advertisements, including an autos group 235, a furniture group 245, and an equipment group 255, each of which contains links for browsing to or obtaining resources under the overall listing of classified ads 230. As should be understood by those skilled in the art, the web page illustrated in FIG. 2 is for purposes of example only and is not limiting of the vast amount of content, information, and links that may be provided in a given web page. For example, each listing heading and/or link may be associated with images, text, music, and the like as designed by a given web page author.

Figure 3:
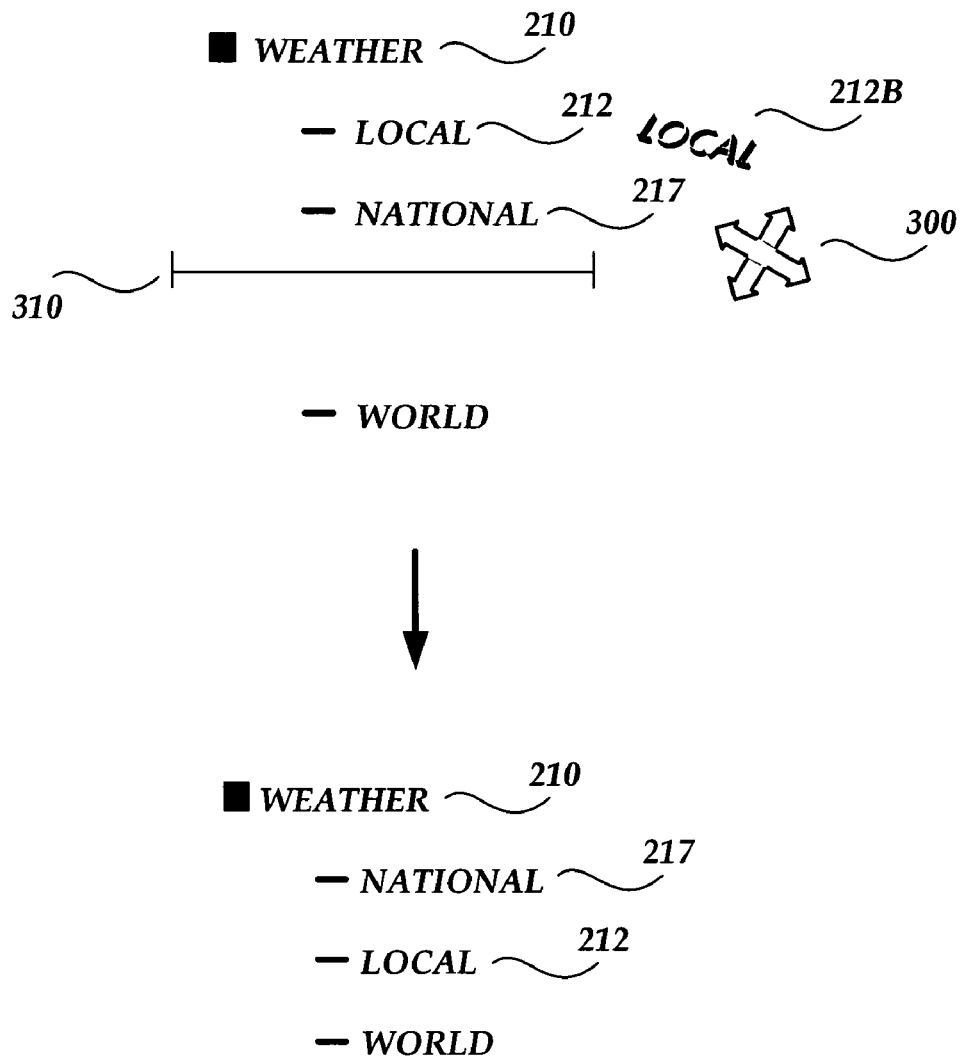
FIG. 3 illustrates a web page part showing a listing of resource links and showing the reordering of the resource links according to embodiments of the present invention.

Referring now to FIG. 3, an example reorganization of the links contained in the links listing 210 is illustrated. Referring to the top portion of FIG. 3, if a web page author/editor desires to reorder the links contained under the weather listing 210, the author/editor selectively places the web page into an edit mode for making edits to content contained in the web page 200. The author/editor then focuses on and selects a link that she desires to move to a different location in the listing 210 or to a different listing 220, 235, 245, 255. According to the example listing illustrated in FIG. 3, the user desires to move the local weather link 212 to a different location in the listing 210 so that the listing is reordered as illustrated in the lower portion of FIG. 3, such that the national weather link 217 is first, the local weather link 212 is second, and the world weather link is third.

According to an embodiment of the present invention, once the author/editor is in a web page edit mode, the author/editor selects (e.g., clicks) a mouse cursor on the link that the she desires to move to a different location. As illustrated in the upper portion of FIG. 3, once the mouse cursor is selected on the link to be moved, for example, the local weather link 212, the mouse cursor 300 changes to a 4-way arrow for providing a visual indication that the selected link will be moved to a different location if the user selects and holds the cursor during movement (dragging) of the link. According to one embodiment, while the link is being dragged, other cursor styles may be presented depending on the conditions of the anticipated drop location. For example, if the dragged item may not be dropped at the desired location, as described below, the cursor may be displayed as a circle with slash through it. If the desired drop is allowed, the cursor may be displayed as a small box cursor for indicating a move operation. According to this embodiment, the 4-way arrow style cursor may be displayed only before dragging commences to indicate that the item may be moved. In addition, as the cursor 300 is moved to a different location, a "ghost" image 212B of the moved link follows the moving 4-way cursor 300 to provide visual feedback of the moving link. According to this embodiment, the "ghost" image is a translucent presentation of the moved link that appears to be attached to the moving cursor 300 as the cursor moves across the web page.

According to embodiments, once the cursor is moved to a position at which the dragged link 212 may be dropped, for example between the national and world weather links, a horizontal line or bar 310 snaps into a position at which the dropped link will be positioned based on the current location of the 4-way cursor 300 if the user releases the cursor. The horizontal line or bar 310 may be colored, for example, red or blue, for providing highlighting to the bar 310. For example, as illustrated in the upper portion of FIG. 3, when the cursor 300 is moved to a position between the national and world weather links, the horizontal line or bar 310 snaps into position between those links to provide immediate feedback in the form of a visual indication as to the result of the link reorganization performed by the author/editor. As illustrated in the lower portion of the FIG. 3, after the cursor 300 is released, the local weather link 212 is repositioned between the national and world weather links. If a given group or listing 210, 220, 235, 245, 255, contains no links and a given link is dragged to such a listing, a horizontal line may be deployed to show that a link is being dragged into an empty group, and that if the link is dropped in the empty group, the dropped link will be present under the group as the sole link of that group.

According to embodiments of the present invention, an entire group of links 215 may be dragged and dropped according to embodiments of the present invention. For example, referring back to FIG. 2, the entire listing 210 including all links comprising the listing 210 may be selected and may be dragged to a different location, such as to a location within the listing 220. As illustrated and described with reference to FIG. 3, when the cursor 300 is moved to a particular location within the links of the listing 220, the horizontal line or bar 310 is snapped into a position to provide a visual indication as to where the multiple links 212, 217, or as to where the entire listing 210 will be positioned when the dragged links or group of links is dropped.

According to an alternative embodiment, when a group of links is dragged from one location in the web page 200 to a different location in the web page 200, as described above, the dropped links or group of links may only be dropped above or below a group of links in a target listing. For example, referring to FIG. 2, if all the links 215 from the listing 210 are dragged to the listing 220, the dropped links or group of links may only be dropped above the links presently contained in the listing 220 or below the group of links contained in the listing 220. According to one embodiment, dragging and dropping an entire group of links may be accomplished by selecting, dragging and dropping the group header rather than having to multi-select all of the links in the group.

Figure 4:
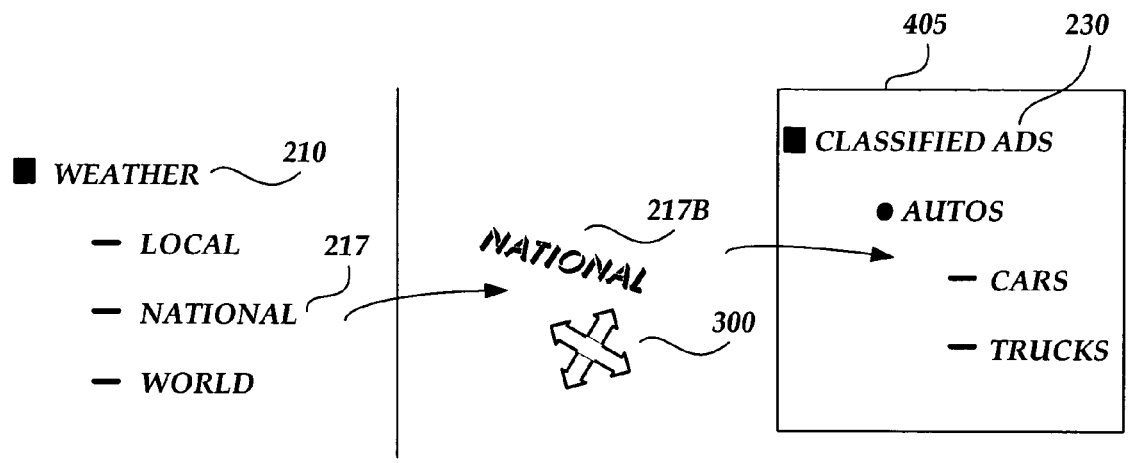
FIG. 4 illustrates the movement of a web page link from a first listing of web page links to a second listing of web page links according to embodiments of the present invention.

Referring now to FIG. 4, when a link or listing such as the listing 217 is dragged and dropped into a group of listings, the ordering of the target group will apply to the link or listing that is being dropped in the target group. For example, if a user drags the national weather listing 217 into the first group of links under the classified ads group 230, the dropped link will respect any group-level ordering that is applied to the target group. For example, if the target group containing the listings "cars" and "trucks" is ordered according to an alphabetical ordering, that group-level ordering will control the resulting ordering after the national weather link 217 is dropped into the target group. That is, the link 217 being dropped into the target group will be positioned in the target group according to the group-level ordering regardless of a position within the target group at which the user positions the cursor 300.

If a group-level ordering is applied to the target group, a horizontal line or bar 310 will not be displayed at a position relative to the cursor 300. Instead, according to an embodiment of the present invention, a highlighting object such as a line 410 may be displayed around the target group to provide a visual indication to the user that the target group has an applied group-level ordering and that the dropped link will take a position in the target group according to the group-level ordering. Thus, the user is not surprised when the dropped link takes a position in the target group different from a desired position. As described above for the horizontal line 310, the line 410 used for providing a box-shaped border around a target group may be colored for highlighting the line 410 and for providing a better visual indication of the group-level ordering applied to the target group. As should be appreciated, if no group-level ordering is applied to the target group, then the horizontal line 310 will snap into a position in the target group of links associated with a position of the cursor 300 at which the user desires to drop the target link.

According to another embodiment, if a link is dragged to a group of links where the nature of the dragged link will be incompatible with a target group of links or other web page control, dropping the link may be disallowed. If dropping a link is disallowed, a visual icon, such as a circle with diagonal line, may be displayed to indicate that the drop operation is not allowed. For example, if a group of links has a group-level ordering causing included links to be sorted by date, and a dragged link has no associated date, dropping the dragged link may not be allowed because the target group may have no way of ordering the dropped link. Or, if a source or target group of links is marked as "locked" so that items may not be removed or added to the group, dropping the dragged link may not be allowed.

Figure 5:
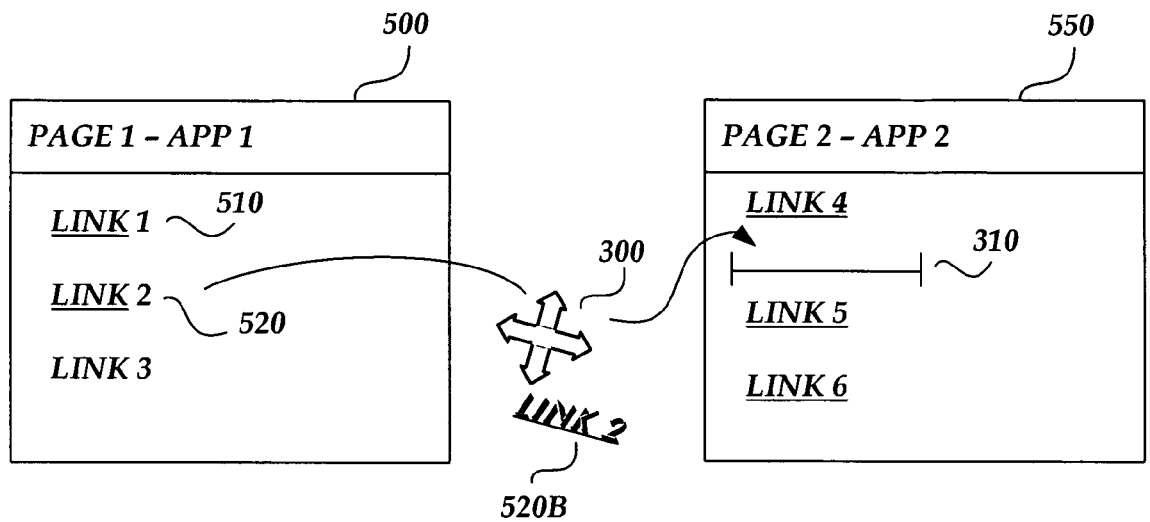
FIG. 5 illustrates the dragging and dropping of a web page link from a first web browsing application page or first client application page to a second web browsing application page according to embodiments of the present invention.

Referring to FIG. 5, a listing element or link 520 may be dragged and dropped from a first application page or first web page 500 to a second web page 550. For example, a first web page 500 may be a first web page of a news organization web site, and a second web page 550 may be a second web page of the same web site. According to embodiments of the present invention, a user may drag and drop a given link or listing element from the first web page to the second web page, as described above with reference to FIGS. 2-4. In addition, a piece of content may be dragged from a non-web page client application document, for example, a word processing application document, a contacts application document, and the like, to a web page for dropping a dragged piece of content onto a target web page for populating a control or other part of the web page with the dropped content. For example, contact information from a contacts application document, for example, name and address of a given contact, may be dragged from a contacts application document from a first application 500 onto a web page 550 presented by a web browsing application for creating a web page listing on the target web page. According to embodiments of the present invention, this operation may be accomplished via a distributed computing network whereby the action of dragging the content from the first application document onto the target web page causes a retrieval of information about the dragged content from different data sources in the distributed computing environment. According to an embodiment, in cross-page drag/drop operations, when a user drags/drops a link from one page to another, the associated text, image, and link information is moved from one web page to another (versus manual copy & paste). Similarly, with cross-application drag/drop, for example, drag/drop from a word processing application document to a web page, the dragged/dropped information is automatically copied from the first application file (e.g., word processing application document) into the link text/image/URL of the web page.

According to embodiments of the present invention, when a given web page listing or link is dragged from one location to another, as described above, a set of properties or behaviors are built around the dragged element or link so that all required information about the link is moved to the target location. According to one embodiment, this operation is accomplished using behaviors of Dynamic Hypertext Markup Language (Dynamic HTML). According to this method, dragging a given web page listing or link causes the creation of a behavior or model associated with the dragged listing or link such that the link and all associated data are moved to the target location so that the link is fully operational once it is dropped in the target location. For example, referring back to FIG. 3, if the local weather link 212 is dragged to the target location between the national and world weather links, a behavior or model is built around the dragged link so that the visual aspects of the dragged link, including the text, underlining, styles, and the like move to the target location, as well as, all associated metadata, images, or underlying coding associated with the dragged link that enables the link to operate as designed. For example, any underlying coding associated with the dragged link that allows the link to serve as a browsing portal to an associated Internet-based resource is captured during the dragging process and is moved with the dragged link to the target location.

Figure 6:
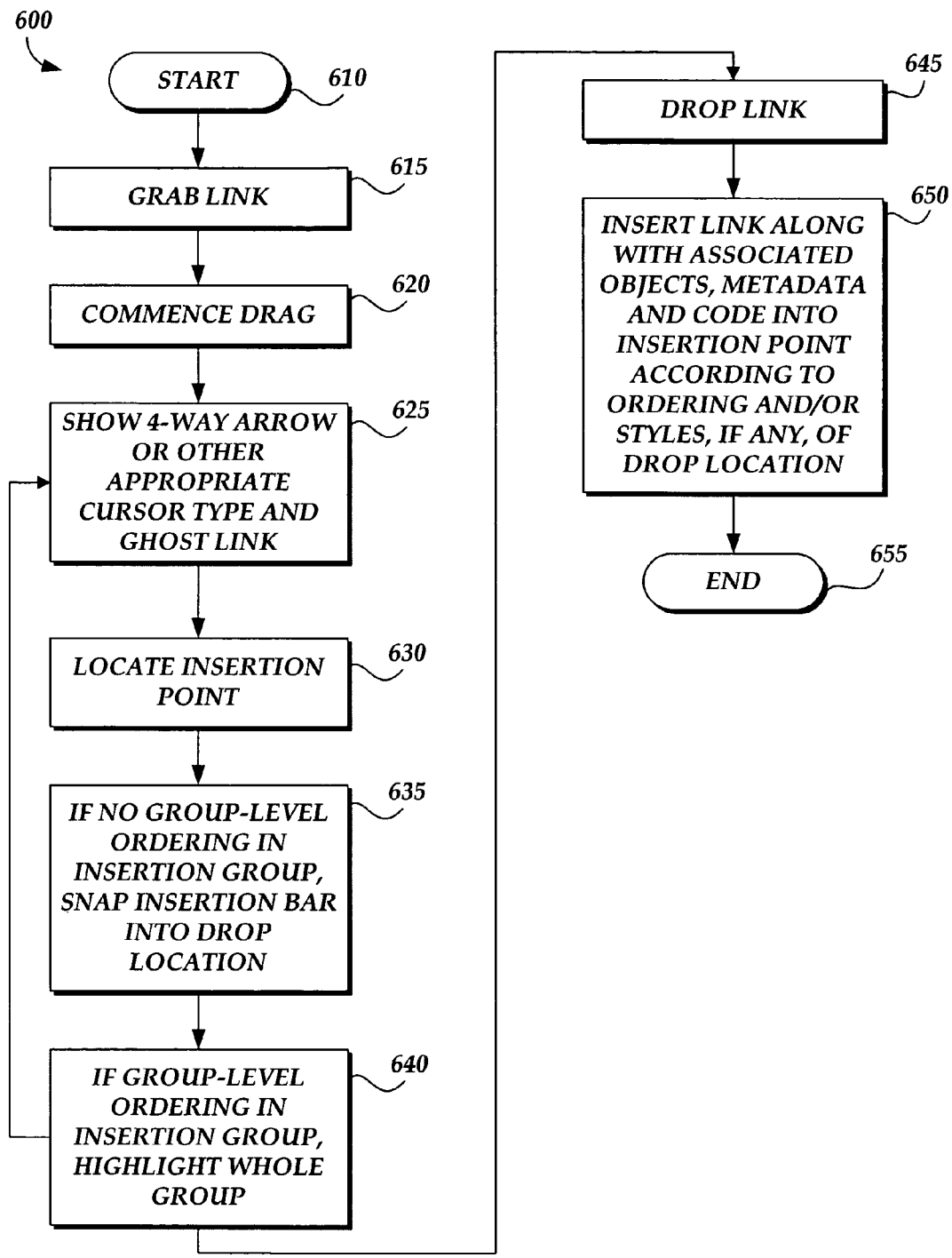
FIG. 6 is a flow diagram illustrating an example routine for reorganizing links on a web page according to a drag and drop operation of the present invention.

Having described an exemplary operating environment and various embodiments of the present invention with respect to FIGS. 1-5 above, FIG. 6 is a flow diagram illustrating an example routine for reorganizing links on a web page according to a drag and drop operation of the present invention. Referring to FIG. 6, the routine 600 begins at start block 610 and proceeds to block 615 where a web page author or other user desires to reorganize one or more web page listings or links for a given web page. At block 615, the web page author/editor selects an edit mode or web page editing application for editing content contained in the selected web page. The web page author then selects one or more links or a given group of links for dragging and dropping to a target location. At block 620, the web page author/editor commences dragging the selected link or links to the target location. At block 625, the cursor is changed to a 4-way arrow, and a "ghost" image of the link follows the 4-way arrow to provide a visual indication of movement of the dragged link or links toward the target location. As described above the cursor may be presented in other forms, for example, circle with slash or cursor box, depending on the conditions of the desired drop location (e.g., drop allowed versus drop not allowed).

At block 630, an insertion point is located by the web page author/editor for dropping the dragged link. At block 635, if no group-level ordering is applied to the target (insertion) group of links or listings, a horizontal insertion bar is snapped into the drop location to provide a visual indication as to where the dragged link will be placed upon dropping the selected link. At block 640, if a group-level ordering is applied to the target or insertion group of listings or links, the entire target group is highlighted, for example, by encircling the target group with a colored line, for alerting the web page author/editor that a group-level ordering is applied to the target group and that the group-level ordering will control the resulting ordering of the group after the dragged link is dropped.

At block 645, the dragged link is dropped by the web page author/user, and at block 650, the link is inserted along with associated objects, metadata, and underlying code into the insertion point according to the ordering of the dropped location. As illustrated in FIG. 6, blocks 625 through 640 are repeated in a loop, in real-time, for each subsequent movement of the cursor that occurs after block 620 (Commence Drag) and prior to block 645 (Drop Link). If the dragged link is dragged content from a different application file, for example, a word processing application file or contacts application file, a copy is performed between the non-web browsing application and the web page so that a copy of the dragged/dropped image, text, etc. is automatically made to the target web page. The routine ends at block 655 where the dragged listing or link is repositioned to the target location, as desired.

As described herein, methods and systems are provided for organizing links or listings of content on a web page via a drag and drop operation. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A computer-readable storage medium on which is stored computer-executable instructions, which when executed by a computer perform a method of organizing elements on a web page, comprising:
   receiving a dragging of a web page element from a first position on a web page to a second position on a second web page;
   at the second position on the second web page, displaying a visual indicator as to where the dragged web page element will be positioned if the dragged web page element is dropped at the second position; and
   upon receiving a dropping of the dragged web page element:
      capturing textual and graphical data associated with the web page element, metadata associated with the web page element, and programming coding associated with the web page element;
      linking the captured textual and graphical data, the metadata, and the programming coding associated with the web page element to the second position on the second web page such that the web page element is enabled to be used for browsing to a given web page resource in the second position; and
      if dropping the web page element into a group of web page elements is compatible with an ordering of the web page elements, reordering the group of web page elements into which the dragged web page element is dropped based on the position of the dropped web page element.

2. The computer-readable storage medium of claim 1, prior to dragging the web page element from a first position on the web page to a second position of the second web page, further comprising:
   receiving a selection a web page editing mode; and
   receiving a cursor selection of the web page element.

3. The computer-readable storage medium of claim 2, upon receiving a cursor selection of the web page element, transforming the cursor into a four-way arrow shaped cursor for providing a visual indication that the focused-on web page element will be moved upon dragging.

4. The computer-readable storage medium of claim 3, upon dragging the selected web page element, providing a translucent image of the dragged web page element for following the cursor as the cursor moves across the web pages.

5. The computer-readable storage medium of claim 1, wherein capturing the textual and graphical data associated with the web page element, the metadata associated with the web page element, and the programming coding associated with the web page element includes capturing the textual and graphical data, the metadata, and the programming coding associated with the web page element via a dynamic HTML behavior model.

6. The computer-readable storage medium of claim 1, wherein displaying a visual indicator on the second web page as to where the dragged web page element will be positioned if the dragged web page element is dropped at the second position includes providing a horizontal line on the second web page at a position on the second web page where the dragged element will be positioned if the dragged web page element is dropped at the second position.

7. The computer-readable storage medium of claim 1, further comprising:
   if the second position on the second web page is within a target group of web page elements that are ordered according to a group-level ordering and dropping the web page element into the target group of web page elements is compatible with the group-level ordering, highlighting the target group of web page elements to provide a visual indication that the target group of web page elements is to be reordered by dropping the web page element into the target group of web page elements.

8. The computer-readable storage medium of claim 7, further comprising:
   upon receiving a dropping of the web page element into the target group of web page elements, positioning the dropped web page element in the target group of web page elements according to the group-level ordering applied to the target group of web page elements.

9. The computer-readable storage medium of claim 8, further comprising:
   if dropping the web page element into the target group of web page elements is incompatible with the group-level ordering applied to the target group of web page elements, disallowing dropping of the web page element into the target group of web page elements.

10. The computer-readable storage medium of claim 9, further comprising:
    upon disallowing dropping of the web page element into the target group of web page elements, providing a visual indication that dropping the dragged web page element into the target group of web page elements is disallowed.

11. The computer-readable storage medium of claim 1, the first web page and the second web page are the same web page.

12. The computer-readable storage medium of claim 11, the first web page is operated by a first web browsing application and the second web page is operated by a second web browsing application.

13. The computer-readable storage medium of claim 1, wherein dragging the web page element from a first position on the first web page to second position on the second web page includes dragging content from a first position on a first client application document to a second position on the second web page.

14. The computer-readable storage medium of claim 1, wherein dragging the web page element includes dragging a group of web page elements.

15. A method of organizing links on a web page, comprising:
   receiving a dragging of a web page link from a first position on a web page to a second position on the web page;
   at the second position on the web page, displaying a visual indicator on the web page as to where the dragged web page link will be positioned if the dragged web page is dropped at the second position;
   upon dragging the selected web page link, providing a translucent image of the dragged web page link for following the cursor as the cursor moves across the web page;
   upon receiving a dropping of the dragged web page link:
      capturing textual and graphical data associated with the web page link, metadata associated with the web page link, and programming coding associated with the web page link;
      linking the captured textual and graphical data, the metadata, and the programming coding associated with the web page link to the second position on the web page such that the web page link is enabled to be used for browsing to a given web page resource in the second position; and
      if dropping the web page link into a target group of web page links is compatible with an ordering of the target group of web page links, reordering the target group of web page links into which the dragged web page link is dropped based on the position of the dropped web page link; and
   if dropping the web page link into the target group of web page links is incompatible with an ordering of the target group of web page links, highlighting the target group of web page links to provide a visual indication that the target group of web page links is not to be reordered by dropping the web page link into the target group of web page links.

16. The method of claim 15, wherein if dropping the web page link into the target group of web page links is incompatible with the ordering applied to the target group of web page links, disallowing dropping of the web page link into the target group of web page links.

17. A computer-readable storage medium on which is stored computer-executable instructions, which when executed by a computer perform a method of organizing links on a web page, comprising:
   receiving a selection a web page editing mode;
   in response to receiving a dragging of a web page link from a first position on a first web page to a second position on a second web page, linking view-level data, metadata, and programming code associated with the web page link to the second position on the second web page;
   at the second position on the second web page, displaying one of: a horizontal line and a bar for showing where the dragged web page link will be positioned if the dragged web page is dropped at the second position for visual feedback;
   upon receiving a dropping of the dragged web page link:
      capturing the view-level data, the metadata, and the programming coding associated with the web page link;
      linking the captured view-level data, the metadata, and the programming coding associated with the web page link to the second position on the second web page such that the web page link is enabled to be used for browsing to a given web page resource in the second position; and
      if dropping the web page link into a target group of web page links is compatible with an ordering of the target group of web page links, reordering the target group of web page links into which the dragged web page link is dropped based on the position of the dropped web page link; and
   if dropping the web page link into the target group of web page links is incompatible with an ordering of the target group of web page links, highlighting the target group of web page links to provide a visual indication that the target group of web page links is not to be reordered by dropping the web page link into the target group of web page links.

18. The computer-readable storage medium of claim 17, whereby dragging the web page link from a first position on the first web page to second position on the second web page includes dragging the web page link from the first position on the first web page operated by a first web browsing application to the second position on the second web page operated by a second web browsing application.

* * * * *